United States Patent [19]

Orensteen et al.

[11] Patent Number: 4,645,301
[45] Date of Patent: Feb. 24, 1987

[54] TRANSPARENT SHEET CONTAINING AUTHENTICATING IMAGE AND METHOD OF MAKING SAME

[75] Inventors: Bruce D. Orensteen, St. Paul; Thomas I. Bradshaw, Afton, both of Minn.

[73] Assignee: Minnesota Mining and Manufacturing Company, St. Paul, Minn.

[21] Appl. No.: 637,606

[22] Filed: Aug. 3, 1984

Related U.S. Application Data

[63] Continuation-in-part of Ser. No. 464,627, Feb. 7, 1983.

[51] Int. Cl.$^4$ .............................................. G02B 27/00
[52] U.S. Cl. ................................................... 350/167
[58] Field of Search .................. 350/105, 167; 283/91, 283/92, 93, 902

[56] References Cited

U.S. PATENT DOCUMENTS

| | | | |
|---|---|---|---|
| 3,154,872 | 11/1964 | Nordgren | 40/135 |
| 3,503,315 | 3/1970 | De Montebello | 95/18 |
| 3,530,779 | 9/1970 | Alofs | 95/18 |
| 3,801,183 | 4/1974 | Sevelin et al. | 350/105 |
| 4,082,426 | 4/1978 | Brown | 350/105 |
| 4,099,838 | 7/1978 | Cook et al. | 350/105 |
| 4,200,875 | 4/1980 | Galanos | 346/1.1 |

OTHER PUBLICATIONS

Burckhardt, B. and Doherty, E. T., "Beaded Plate Recording of Integral Photographs", *Applied Optics*, pp. 2329–2331 (Nov., 1969).

*Primary Examiner*—John K. Corbin
*Assistant Examiner*—Vincent J. Lemmo
*Attorney, Agent, or Firm*—Donald M. Sell; James A. Smith; Douglas B. Little

[57] ABSTRACT

The novel transparent sheet contains at least one authenticating image, each image being viewable from the front of the sheet, but only across a cone which preferably is less than 90°. The novel sheet may be adhesively bonded over information areas of a document for authenticating purposes. When such an authenticating image is viewable only from an angle appreciably different from angles at which the document is ordinarily viewed, the image is obscure in that users of the document will notice the authenticating image only when confirming the authenticity of the document. Usually each authenticating image is viewable only across a cone of about 10 to 20 degrees.

21 Claims, 5 Drawing Figures

TRANSPARENT SHEET CONTAINING AUTHENTICATING IMAGE AND METHOD OF MAKING SAME

CROSS-REFERENCE TO RELATED APPLICATION

This application is a continuation-in-part of U.S. patent application Ser. No. 464,627, filed Feb. 7, 1983 (Hockert et al.), which concerns a directionally imaged sheet that may be made from retroreflective sheeting including a monolayer of microlenses, a transparent spacing layer covering at least the back surfaces of the microlenses, and a specularly reflective layer covering the spacer layer at approximiately the focal point of a light ray passing through each microlens. A pattern of highly collimated light such as a laser beam is directed at a specific angle through the sheeting to form openings in the specularly reflective layer along axes of the light through the microlenses. This provides a directionally imaged sheet, the openings of which are viewable from the front of the sheet as an image that may be obscure in the sense that it appears only at approximately said specific angle. When colored matter is applied to the openings, the image becomes colored. The directionally imaged sheet may be employed to utilize its retroreflectivity or may be made transparent by removing its specularly reflective layer. Upon doing so, it may be used as an overlay film, e.g., to authenticate documents such as drivers licenses.

FIELD OF THE INVENTION

The present invention relates to substantially transparent sheets which contain images that serve to authenticate documents or other objects to which the sheets may be adhesively bonded.

BACKGROUND ART

U.S. Pat. No. 3,801,183 (Sevelin et al.) discloses a substantially transparent sheet to be used as an overlay on a document such as a credit card, a pass, a license, or a phonograph label to serve as an identifying or authenticating marking. The sheet is retroreflective over its entire surface area and also contains a retroreflecting image such as a pattern or legend which is obscure in that it may be invisible or indistinctly visible to the naked eye under diffuse light and so does not obstruct any underlying visual information. Since the image is either more or less brightly retroreflective than the background areas, it becomes quite visible when viewed under retroreflective light. Because of these attributes, the sheet of the Sevelin patent is widely used to make more difficult the counterfeiting of phonograph records, audio and video cassettes, drivers licenses, vehicle titles, and passports.

A preferred sheet of the Sevelin patent comprises a monolayer of glass microspheres bearing a patterned dielectric mirror which incorporates the aforementioned obscure image. U.S. Pat. No. 4,099,838 (Cook et al.) discloses a sheet similar to that preferred Sevelin sheet, but modified such that reflective areas of the dielectric mirror have differing effective optical thicknesses in the legend and background areas so that the color retroreflected from background areas is different from the color retroreflected from areas of the obscure image. The sophistication of the technology needed to achieve such color contrasts increases the difficulty of counterfeiting.

Other retroreflective sheets containing images, which may be obscure, could be adhesively bonded to documents to make counterfeiting more difficult. For example, see U.S. Pat. Nos. 3,154,872 (Nordgren) and No. 4,082,426 (Brown), but the imaged sheets of those patents are not transparent and so would obstruct information over which they were applied.

Although U.S. Pat. No. 4,200,875 (Galanos) says nothing about counterfeiting, it too concerns a retroreflective sheet which contains an image that may be obscure. The image-bearing sheet is opaque and so would obstruct information if it were adhered to a document for authenticating purposes.

DISCLOSURE OF INVENTION

The invention concerns a substantially transparent authenticating sheet which like that of the Sevelin patent contains an authenticating image, such as a legend or pattern, which can be obscure. Like the sheet of the Sevelin patent, the novel authenticating sheet is adapted to be adhesively bonded over information areas of a document without appreciably interfering with the legibility of that information, and contains a monolayer of transparent microlenses, preferably glass microspheres of at least 1.8 refractive index, also preferably having diameters averaging in the 10 to 300 micrometer range. As does the sheet of FIGS. 5 and 6 of the Sevelin patent, a spacing layer of transparent material covers at least the back surfaces of the microlenses. The novel authenticating sheet differs from that of the Sevelin patent by having at least one set of axial markings on the back surface of the transparent spacing layer ("axial markings" are defined as visibly distinctive structures of limited area, whose center points are respectively located on axes that extend through the optical center of individual microlenses and intersect at a common viewing point or line, or are parallel to one another).

The axial markings are viewable as an authenticating image from the front of the sheet only within a restricted range of angles which form a conical field of view (i.e., a cone), the angle of which preferably is less than 90°. The novel authenticating sheet may include one or more additional sets of such axial markings, each viewable as an authenticating image from a different angle. Preferably, the cones across which each authenticating image is viewable do not overlap, and hence the angle of each cone should be less than 60°. When the axial markings are specularly reflective, each authenticating image is retroreflective, and is visible either in diffuse light or when viewed retroreflectively, but only across the same conical field of view.

The novel authenticating sheet may be constructed from retroreflective sheeting including a monolayer of microspheres, a specularly reflective layer disposed behind the microspheres, and a spacing layer of transparent material disposed between the back surfaces of the microspheres and the specularly reflective layer to position the specularly reflective layer at approximately the focal points of light rays passing through each microsphere. Using that sheeting, a method of making the authenticating sheet of the invention begins with the step of directing a pattern of highly collimated light, such as is emitted by a laser, at a specific angle toward the front of the sheeting to form a corresponding pattern of small openings in the specularly reflective layer along axes of the light through the microspheres. However, the novel authenticating sheet may also be prepared from sheeting having a monolayer of microlenses other than microspheres, e.g., the lenticular sheeting taught in U.S. Pat. No. 3,503,315 (de Montebello), and the specularly reflective layer can be replaced by any chemically removable masking layer in which openings can be formed by focused collimated light. Starting with any such microlens sheeting, the authenticating sheet of the invention can be made by the sequential steps of (1) directing highly collimated light, such as is emitted by a laser, at a specific angle toward the front of the sheeting to form a pattern of small openings in the masking layer along axes of the light through the microlenses, (2) depositing a permeable visible coating over the masking layer and into its openings, (3) applying onto the permeable coating a chemical which permeates the coating and removes the masking layer, and (4) removing the permeable coating except leaving a set of axial markings where it has penetrated said openings, thus providing a transparent authenticating sheet wherein said markings afford an image visible from the front of the sheet only across a cone centered on said specific angle.

Preferably, the microlens sheeting used in step (1) has a layer of transparent material covering the front surfaces of the microlenses, thus protecting them and affording an easily cleanable front surface. Such a transparent, protective coating is necessary whenever the refractive index of the microlenses exceeds approximately 1.9 so that collimated light can be focused on the masking layer. The refractive index of the microlenses preferably is at least 2.1 in order to allow the spacing layer to be desirably thin. Microlenses having refractive indices above 2.4 are currently unduly expensive and may introduce coloring, whereas colorless clarity is usually preferred so that the novel authenticating sheet may be as unobtrusive as possible after being applied to a document to be authenticated.

Preferably the highly collimated light used in step (1) is a pulsed laser beam. The light may scan the entire or selected portions of the face of the microlens sheeting through a mask to form a pattern of holes in the masking layer, or a pattern of holes can be created by using a specially shaped scanning pattern and/or by repeatedly turning the light on and off. The set of markings formed at the resulting pattern of holes provide an authenticating image that may be an alphanumeric message, a symbol, or the like. On the other hand, the authenticating image may uniformly extend across the whole or a portion of the authenticating sheet since the resultant image would nevertheless have a visibly distinctive, and hence authenticating, appearance because it could be viewed only at approximately the aforementioned specific angle.

Prior to carrying out the aforementioned step (2), step (1) may be repeated at a different specific angle, thus providing a transparent authenticating sheet of the invention wherein one authenticating image is visible at the first specific angle and another authenticating image is visible at said different specific angle. A third or more repetitions of step (1) would provide more than two authenticating images.

Where an authenticating sheet of the invention has two or more authenticating images, one may be viewable along a line bisecting the underlying document from top to bottom and at approximately an angle of 100 degrees from the bottom of the document. A second authenticating image may be viewable along the same line at approximately an angle of 125 degrees from the bottom of the document. By being positioned along that line, the authenticating images are more easily located. However, the authenticating sheet could have more authenticating images, e.g., four images viewable at angles of 100 and 125 degrees from the bottom of the document by rotating the document 45° in either direction.

When each authenticating image is viewable only from an angle appreciably different from angles at which the document is ordinarily viewed, the image is obscure in that users of the document will notice the authenticating image only when confirming the authenticity of the document. For example, any authenticating image which is viewable only at an obtuse angle from the bottom of the document would be obscure since one normally views any document either orthogonally or at an acute angle from the bottom of the document. In certain circumstances, it might be desired to make an authenticating image visible only at an angle approximately orthogonal to the face of the authenticating sheet, thus absolutely instructing the reader that there is something special about the document. Such a document could be viewed at a different angle to avoid the annoyance which might otherwise result from the authenticating image. When an authenticating image is viewable orthogonally, is retroreflective and uniformly extends across certain information on the face of a document, it may render that information uncopyable in a copier which directs light orthogonally.

In a preferred transparent sheet of the invention, the microlenses are glass microspheres having an average diameter of approximately 50 micrometers. For such a sheet, each of the markings may have a diameter within a range from 1 to 20 micrometers, preferably all of substantially the same diameter so that every marking providing a single authenticating image is visible across substantially the same conical field of view. When the microlenses are all about 50 micrometers in diameter and the diameter of the markings is from 3 to 10 micrometers, each authenticating image is viewable only across a cone of about 10 to 20 degrees. Larger individual markings afford proportionately larger viewing cones. When the diameter of each marking is much less than 3 micrometers, one might find it difficult to locate an authenticating image.

Preferred microlens sheeting used in the above-outlined four steps has a specularly reflective layer such as an aluminum thin film which dissolves in dilute alkali such as caustic soda. With such preferred sheeting, the permeable coating applied in step (2) may be a specularly reflective metallic thin film such as copper, tin, chromium, or nickel which is resistant to dilute alkali but either has minute pores or cracks or can be mechanically flexed between steps (2) and (3) to produce cracks through which dilute alkali can permeate in step (3) to dissolve the aluminum. Upon dissolving the aluminum, the permeable coating is undercut except where it has penetrated openings in the aluminum and thus is easily flaked away except at markings where it adheres directly to the spacing layer and thus has not been undercut. Because its pores or cracks may be quite superficial, it may be desirable or necessary to flex the permeable coating between steps (3) and (4) to create or accentuate cracks to the point that substantially none of the markings is carried away in step (4).

Following step (4) may be a step (5) of applying over the exposed spacer layer and the markings a layer of transparent adhesive, such as a pressure-sensitive adhesive or a heat-activatable adhesive, by which the novel transparent sheet can be adhesively bonded to a document. By doing this in a manufacturing plant, a uniformly thick adhesive layer is readily achieved, thus insuring that the face of the novel transparent sheet will be parallel to the face of the underlying document. Furthermore, the adhesive layer protects the markings.

For reasons taught in the aforementioned Sevelin patent, the transparent authenticating sheet of the invention preferably has a diffuse reflectance "D" of less than 20 percent, ideally less than 10 percent. Moreover, the diffuse transmittance "T" of the novel authenticating sheet is preferably greater than 60 percent, and ideally greater than 80 percent. In any event, the diffuse reflectance D should be small enough to avoid obscuring any dark areas of a document to which the novel sheet is adhesively bonded, and the diffuse transmittance T should be large enough to preserve lighter areas of the document.

DESCRIPTION OF THE DRAWINGS

In the drawing, FIGS. 1–4 schematically illustrate in cross-sections a preferred process for converting retroreflective sheeting into a preferred transparent authenticating sheet of the invention. Specifically.

FIG. 1 shows retroreflective sheeting 10 which can be used to make a transparent authenticating sheet 12 of the invention which is shown in FIG. 4. The retroreflective sheet 10 has a monolayer of transparent microspheres 14, a protective coating 16 of transparent material covering the front surfaces of the microspheres, and a spacing layer 18 of transparent material covering the back surfaces of the microspheres. The protective coating has a flat exterior face 20, while the exterior face 22 of the spacing layer 18 is contoured, generally following the curved back surfaces of the microspheres 14. Covering the exterior face 22 of the spacing layer 18 is a thin masking layer 24 which may be specularly reflective, for example, a layer of vapor-deposited aluminum or chemically deposited silver. As seen in FIG. 1, a laser beam is directed at the retroreflective sheet 10 at an angle, alpha, to its flat exterior face 20, and portions of the beam which pass a mask 26 are focused by the microspheres 14 to create a pattern of axial openings 28 in the masking layer 24. Next, a permeable coating such as a specularly reflective metallic thin film layer 30 is deposited over the masking layer 24 and its openings 28 as seen in FIG. 2. The specularly reflective layer 30 is either so deposited as to develop a large number of cracks 32, or the sheeting 10 is then mechanically flexed or elastically stretched to create cracks, so that a chemical will permeate the cracks to dissolve or otherwise remove the underlying masking layer 24 as seen in FIG. 3. Its removal undercuts the permeable specularly reflective layer 30, and because the cracks 32 make it frangible, it is then readily removed by gentle brushing or rubbing, except leaving (as seen in FIG. 4) a set of specularly reflective axial markings 34 where it directly contacts the spacing layer 18 at the locations of the openings 28. The axial markings 34 of the resulting transparent authenticating sheet 12 can be seen only across a cone centered on the angle alpha, and form a dark authenticating image in ambient light and a reflecting image when viewed retroreflectively.

As shown in FIG. 4, a layer 36 of transparent adhesive may be applied over the exterior face of the spacing layer 18 and its markings 34, thus both protecting the markings and allowing the transparent authenticating sheet 12 to be adhered to a document 38 for purposes of authenticating the document. FIG. 5 shows the face of the document 38 viewed from the angle alpha at which its authenticating image 40 becomes visible.

EXAMPLE 1

Figure 1:
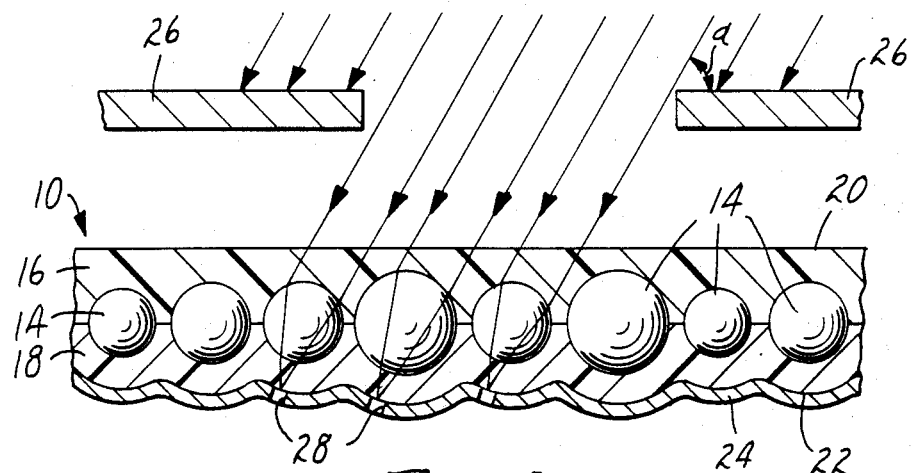
FIG. 1 shows retroreflective sheeting having a specularly reflective masking layer in which openings are being formed by a laser beam.
Figure 2:
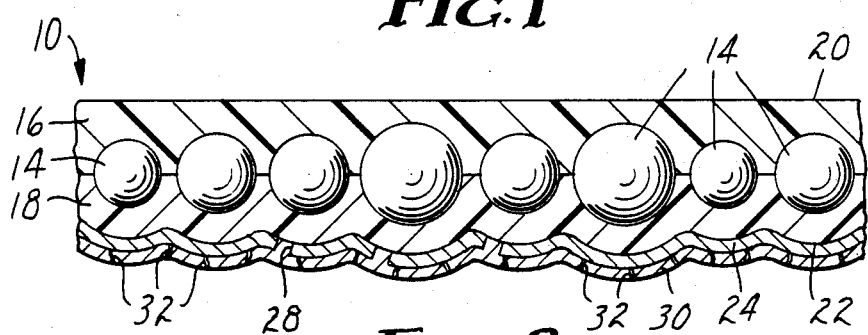
FIG. 2 shows a permeable, specularly reflective, metallic thin film applied over the masking layer and its openings.
Figure 3:
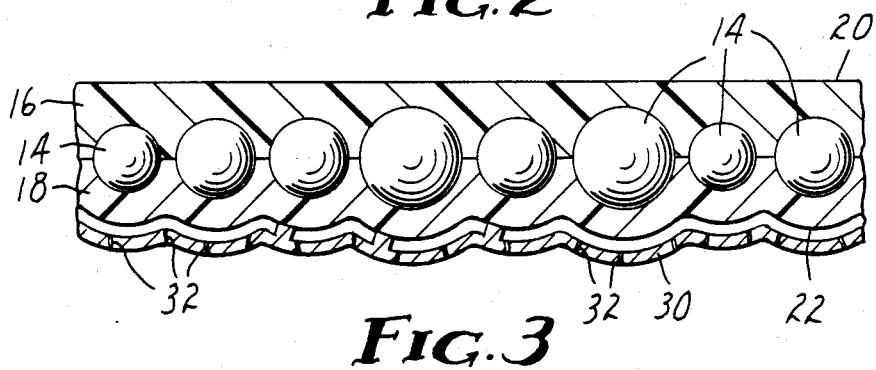
FIG. 3 shows the sheeting after the masking layer of FIG. 1 has been etched away.

Retroreflective sheeting as illustrated in FIG. 1 contained a monolayer of clear, transparent microspheres 14 having an average diameter of 60 micrometers and a refractive index of 2.25, a clear, transparent alkyd resin protective coating 16 about 50 micrometers in thickness, a clear, transparent alkyd resin spacing layer 18 about 15 micrometers in thickness, and a vapor-deposited aluminum masking layer 24 about 100 nm in thickness.

The retroreflective sheeting was irradiated from the front using a Q-switched neodymium-yttrium-aluminum-garnet laser which was operated at 90 watts average, pulsewidth of about 200 nanoseconds, and pulse repetition frequency of 17 kHz. Its wavelength was about 1.06 micrometers and its spot size was about 3 mm. A mask was placed to effect selective irradiation of the sheeting in the pattern of the state seal of Illinois. The laser beam was scanned across the entire mask at an alpha angle of 75° and at a speed of 1000 cm/sec. At the end of each scan, the sheeting was moved 1.3 mm in a direction normal to the scan. By doing so, a pattern of openings 28 (FIG. 1) was formed in the aluminum masking layer 24.

Figure 4:
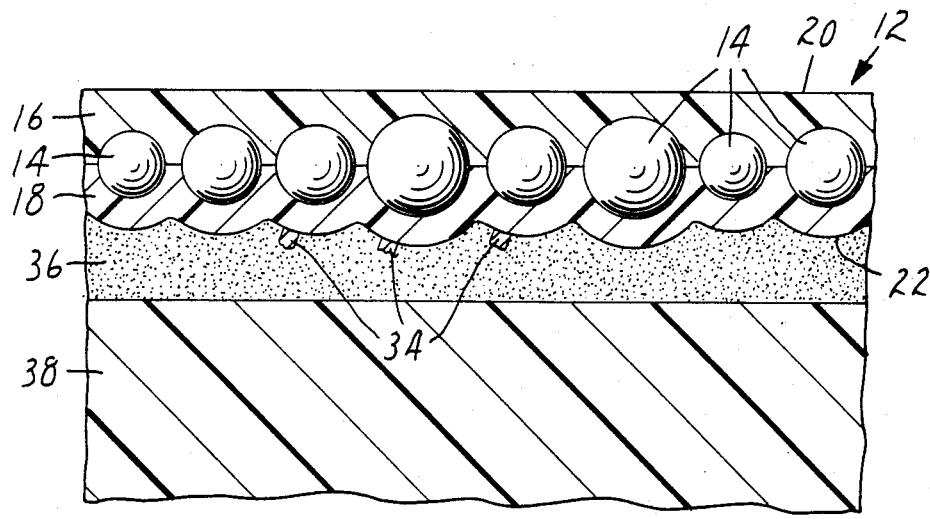
FIG. 4 shows both the sheeting after removal of the metallic thin film layer, leaving a preferred transparent authenticating sheet of the invention, and also the application of the authenticating sheet to a document to be authenticated.
Figure 5:
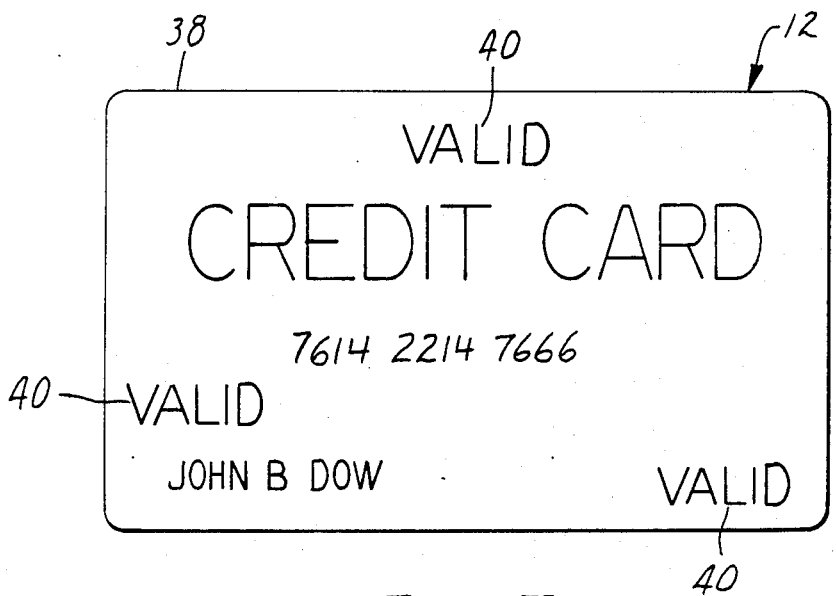
FIG. 5 shows the face of the document of FIG. 4 viewed from the specific angle at which its authenticating image becomes visible.

The sheeting was then placed in a bell jar, and over the aluminum masking layer 24 was vapor-deposited a specularly reflective layer 30 of tin to a thickness of approximately 100 nm. The sheeting was immersed in a mild solution of caustic soda. The aluminum masking layer was dissolved, causing much of the tin layer 30 to lift off, followed by gentle brushing to remove the tin completely, except leaving a set of axial markings 34 (FIG. 4) where openings had been formed, thus creating an authenticating sheet of the invention.

To the exposed spacing layer 18 and its markings 34 was transferred a clear pressure-sensitive adhesive layer (thickness 25 micrometers) by which the authenticating sheet was adhered to a photocopy of a vehicle title with the alpha angle oriented toward the top of the title. When viewed in an ordinary manner, the appearance of the vehicle title was virtually unchanged. However, when the title was placed on a flat table and viewed at an angle of 105° from the bottom of the title along a line bisecting the title from top to bottom, the Illinois state seal became clearly visible in ambient light as a dark authenticating image. When viewed retroreflectively, that image was specularly reflective. The full image was visible across a cone of about 20° and spots of the image were viewable between that cone and a cone of about 25°.

EXAMPLE 2

Retroreflective sheeting was laser-irradiated as in Example 1 except through a first mask at an alpha angle of 60° and, after rotating the sheeting 180°, through a second mask at the same alpha angle. The first mask showed words and the second mask showed an eagle.

After depositing a vapor coat of copper over the double-imaged aluminum masking layer, the sheeting was flexed by being drawn over a sharp edge and then rinsed in a dilute sodium hydroxide bath. As the aluminum was dissolved, the copper lifted off except at axial markings where it was in direct contact with the spacing layer. The resulting sheet was transparent except that distinct authenticating images could be seen under ambient lighting conditions at each of the angles at which the sheeting had been irradiated. Both images were retroreflective.

EXAMPLE 3

Retroreflective sheeting was laser-irradiated as in Example 1 except the laser spot size was about 2.5 mm. Then over the aluminum masking layer was applied, using a transparency marking pen, an alcohol-glycol-ether-based ink with purple organic dye (3M Brand Permanent Transparency Marking Pen No. 0389-5). Upon doing so, the axial openings appeared somewhat darker and together formed a faint colored image of the state seal. Upon immersion in a mild solution of caustic soda, the aluminum masking layer dissolved, carrying with it the ink layer except at a set of axial markings at the openings.

To the resulting authenticating sheet was transferred a clear pressure-sensitive adhesive layer by which the sheet was adhered to a photo-copy of a vehicle title. When later viewed in an ordinary manner, the appearance of the title was virtually unchanged, but at an angle of 105° from the bottom of the title, the Illinois state seal was clearly visible as a dark authenticating image across a cone of about 20°.

EXAMPLE 4

Retroreflective sheeting as shown in FIG. 1 of the aforementioned U.S. patent application Ser. No. 464,627 (specifically "Scotchlite" Brand Engineer Grade No. 3290 Reflective Sheeting supplied by Minnesota Mining and Manufacturing Company), which was complete except for absence of adhesive and release liner, was irradiated on the front of the sheeting using a Q-switched neodymium-doped yttrium-aluminum-garnet laser operated at a pulse repetition rate of 3.4 kilohertz, 7 watts average power, to provide a nominally collimated 3-millimeter-diameter beam. The beam was perpendicular to the sheeting, and the sheeting was moved under the beam in a raster pattern, moving at a rate of 100 inches (254 centimeters) per minute in the X direction, and being stepped 1.5 millimeters in the Y direction at the end of each X direction scan. The pulse length was between 200 and 400 nanoseconds, and at the described rate of movement each pulse overlapped by about 98 percent areas which had been irradiated by a previous pulse.

After completion of this operation, the sheeting was viewed in diffuse or ambient light as well as under retroreflective viewing conditions from a variety of angles. The sheeting was generally whitish in appearance in diffuse light, and was brightly reflective under retroreflective viewing conditions, but it had a black coloration either in diffuse light or under retroreflective viewing conditions when viewed on a line perpendicular to the sheeting, i.e., the angle at which the sheeting was irradiated by the laser beam.

The back vapor-coated aluminum surface of the sheeting was viewed under a microscope, and openings in the vapor-coated aluminum layer about 3 to 5 micrometers in diameter were observed behind each microsphere. The openings were disposed on the optical axes of the microspheres perpendicular to the front face of the sheeting, that is, on axis with the laser beam, and at the approximate focal points for the portions of the laser beam transmitted by each microsphere.

The irradiated sheeting was marked on its back vapor-coated surface in selected areas with marking pens containing different colored inks (3M Brand Permanent Transparency Marking Pen Nos. 00-0015-0299-6 (red), 0387-9 (blue), 0388-7 (green), and 0389-5 (purple)). When viewed from the front along a line perpendicular to the sheeting, the sheeting continued to appear generally black, with only a slight coloration in the areas where it had been marked. However, when viewed along a line slightly displaced from a perpendicular line, the sheeting was colored in the areas that had been marked and had a bright colored retroreflection. Specifically, the sheeting was black through a range of angles about 8° on either side of a line perpendicular to the sheeting, and the colored ink-formed image was visible when viewed at an angle of about 8° through 12° from the perpendicular line.

The aluminum vapor-coated layer was then etched away from the sheeting using a mild sodium hydroxide solution. The polymeric material revealed after removal of the vapor-coated layer did not appear to have been significantly disturbed except that slight circular ridges were detected that appeared to coincide with the edges of the openings that had been formed in the vapor-coated layer. In the areas that had been marked with a pen, ink was seen to have diffused into the polymeric material which had supported the vapor-coated layer in areas surrounding the openings in the vapor-coated layer. The diameter of the area of ink diffusion was approximately twice the diameter of the opening that had existed in the vapor-coated layer. Polymeric material was removed to allow inspection of the glass microspheres, but no damage to the microspheres was detected.

If a would-be counterfeiter were to attempt to alter the face of a document to create a visual effect comparable to that provided in any of Examples 1–4, he or she would find it exceedingly difficult without doing so in the same way, especially to create the visual effect provided by the marginal spots appearing beyond the core within which the full image can be viewed. Very few would-be counterfeiters would have the technical expertise to duplicate the authenticating sheets of Examples 1–4.

We claim:

1. Substantially transparent sheet containing an authenticating image, which sheet is adapted to be adhesively bonded over information areas of a document without appreciably interfering with the legibility of that information, said sheet containing a monolayer of transparent microlenses, and a transparent spacing layer covering at least the back surfaces of said microlenses, wherein the improvement comprises:
   a set of axial markings on the back surface of the transparent layer viewable as an authenticating image from the front of the sheet only across a conical field of view.

2. Transparent sheet as defined in claim 1 wherein the microlenses are glass microspheres.

3. Transparent sheet as defined in claim 2 wherein transparent material also covers the front surfaces of said microspheres, and the microspheres have an index of refraction of at least 1.9.

4. Transparent sheet as defined in claim 1 wherein said markings are specularly reflective, and said authenticating image is retroreflective.

5. Transparent sheet as defined in claim 1 wherein on the back surface of the transparent spacing layer a second set of axial markings is viewable as a second authenticating image from the front of the sheet across a cone of less than 60° which does not overlap the first-mentioned conical field of view.

6. Transparent sheet as defined in claim 1 wherein said markings are positioned to provide an obscure authenticating image which can be viewed only across a cone of about 10 to 20 degrees, and approximately at an angle to the face of the sheet which is appreciably different from angles at which documents are normally viewed.

7. A document to which is adherently bonded the back of a transparent authenticating sheet as defined in claim 1.

8. Method of making a substantially transparent sheet which contains an authenticating image, which method employs sheeting containing a monolayer of microlenses, a transparent spacing layer covering at least the back surfaces of the microlenses, and a masking layer covering the spacing layer at approximately the focal points of light rays passing through each microlens, said method comprising the sequential steps of
   (1) directing highly collimated light at a specific angle toward the front of the sheeting to form a pattern of small axial openings in the masking layer along axes of the light through the microlenses,
   (2) depositing a permeable visible coating over the masking layer and into its openings,
   (3) applying to the permeable coating a chemical which permeates the coating and removes the masking layer, and
   (4) removing the permeable coating except leaving a set of axial markings where it has penetrated said openings, thus providing a transparent authenticating sheet wherein said markings afford an authenticating image visible from the front of the sheet only across a cone centered on said specific angle.

9. Method as defined in claim 8 wherein said highly collimated light is a pulsed laser beam.

10. Method as defined in claim 8 wherein prior to step (2) the directing step (1) is repeated at a different specific angle, thus providing a transparent authenticating sheet wherein one image is visible at the first mentioned specific angle and another image is visible at said different specific angle.

11. Method as defined in claim 9 wherein in step (1) the laser beam scans the entire face of the retroreflective sheeting and a mask allows the beam to strike only selected areas of the retroreflective sheeting.

12. Method as defined in claim 8 wherein the masking layer is an aluminum thin film.

13. Method as defined in claim 12 wherein the chemical used in step (3) is a dilute alkali.

14. Method as defined in claim 13 wherein the permeable coating deposited in step (2) is a specularly reflective metallic thin film which is resistant to dilute alkali.

15. Method as defined in claim 14 wherein the permeable coating is copper.

16. Method as defined in claim 14 wherein the permeable coating is tin.

17. Method as defined in claim 14 including between steps (2) and (3) the added step of mechanically flexing said metallic thin film to enhance its permeability to dilute alkali.

18. Method as defined in claim 14 including between steps (3) and (4) the added step of gently brushing or rubbing said metallic thin film to enhance removal of the metallic thin film without removing said markings.

19. Method as defined in claim 8 including the additional step (5) of applying over the exposed spacing layer and markings a layer of transparent adhesive by which the transparent authenticating sheet can be adhesively bonded to a document.

20. A substantially transparent sheet containing an authenticating image, which sheet is adapted to be adhesively bonded over information areas of a document without appreciably interfering with the legibility of that information, said sheet comprising a monolayer of transparent microlenses, a transparent spacing layer covering at least the back surfaces of said microlenses, and a set of specularly reflective axial markings on the back surface of the transparent layer viewable as an authenticating image from the front of the sheet only across a conical field of view.

21. Method of making a substantially transparent sheet which contains an authenticating image, which method employs sheeting containing a monolayer of microlenses, a transparent spacing layer covering at least the back surfaces of the microlenses, and a masking layer covering the spacing layer at approximately the focal points of light rays passing through each mircolens, said method comprising the sequential steps of
   (1) directing highly collimated light at a specific angle toward the front of the sheeting to form a pattern of small axial openings in the masking layer along axes of the light through the microlenses,
   (2) depositing a permeable specularly reflective coating over the masking layer and into its openings,
   (3) applying to the permeable coating a chemical which permeates the coating and removes the masking layer, and
   (4) removing the permeable coating except leaving a set of specularly reflective axial markings where it has penetrated said openings, providing a transparent authenticating sheet wherein said markings afford an authenticating image visible from the front of the sheet.

* * * * *